United States Patent
Bullis et al.

(10) Patent No.: US 10,127,024 B2
(45) Date of Patent: Nov. 13, 2018

(54) MANAGING REUSE OF ASSETS IN A WORKFLOW MANAGEMENT SYSTEM

(71) Applicant: International Business Machines Corporation, Armonk, NY (US)

(72) Inventors: Paul K. Bullis, Cedar Park, TX (US); Geoffrey M. Hambrick, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 15/191,127

(22) Filed: Jun. 23, 2016

(65) Prior Publication Data
US 2017/0371632 A1    Dec. 28, 2017

(51) Int. Cl.
G06F 9/44 (2018.01)
G06F 8/36 (2018.01)
G06F 8/70 (2018.01)

(52) U.S. Cl.
CPC . *G06F 8/36* (2013.01); *G06F 8/70* (2013.01)

(58) Field of Classification Search
CPC ................. G06F 8/36; G06F 8/70; G06F 8/73
USPC ........................................................ 717/120
See application file for complete search history.

(56) References Cited

U.S. PATENT DOCUMENTS

| | | | |
|---|---|---|---|
| 6,226,792 B1 | 5/2001 | Goiffon et al. | |
| 6,697,819 B2 * | 2/2004 | Boudreau | G06F 17/3056 |
| 6,817,008 B2 * | 11/2004 | Ledford | G06Q 10/10 |
| | | | 715/234 |
| 7,318,216 B2 * | 1/2008 | Diab | G06F 8/24 |
| | | | 707/999.103 |
| 8,141,038 B2 * | 3/2012 | O'Connell | G06F 8/36 |
| | | | 717/103 |
| 8,261,246 B1 * | 9/2012 | Naroff | G06F 8/71 |
| | | | 717/106 |

(Continued)

FOREIGN PATENT DOCUMENTS

| | | |
|---|---|---|
| EP | 001405221 A1 | 4/2004 |
| WO | 003005243 A1 | 1/2003 |
| WO | 2007064509 A2 | 6/2007 |

OTHER PUBLICATIONS

Software Reusability; Soo Dong Kim; Soongsil University, Department of Computer ScienceSeoul, Korea; Wiley Encyclopedia of Computer Science and Engineering, edited by Benjamin Wah—Mar. 16, 2009.*

(Continued)

*Primary Examiner* — Francisco Aponte
(74) *Attorney, Agent, or Firm* — Garg Law, Firm, PLLC; William Hartwell

(57) ABSTRACT

A category is determined of a task being planned at a given time. A collection of assets is identified, the collection having been used in a similar task at a past time. An experience report associated with an asset in the collection is extracted into a set of encapsulated experience reports, where the experience report was generated from the similar task at the past time. A degree of usability is computed corresponding to the collection, the collection being usable in the category of the task up to the degree of usability. According to the degree of usability of the collection, the collection is positioned in a sorted list of reusable assets. A reusable asset is selected from the sorted list for use in the task.

19 Claims, 8 Drawing Sheets

(56) References Cited

U.S. PATENT DOCUMENTS

| | | | | |
|---|---|---|---|---|
| 8,266,581 B2* | 9/2012 | Brandt | | G06F 8/36 717/106 |
| 8,370,803 B1* | 2/2013 | Holler | | G06F 8/36 717/101 |
| 8,412,813 B2* | 4/2013 | Carlson | | G06F 8/36 707/610 |
| 8,418,126 B2* | 4/2013 | Chaar | | G06Q 10/06 717/104 |
| 8,739,047 B1* | 5/2014 | Holler | | G06F 3/04842 715/221 |
| 8,756,258 B2* | 6/2014 | Mazo | | G06F 8/36 703/13 |
| 8,769,482 B2* | 7/2014 | Batey | | G06F 8/36 717/104 |
| 8,856,174 B2* | 10/2014 | Fueta | | G06Q 10/063 707/776 |
| 9,110,893 B2* | 8/2015 | Bullis | | G06F 17/30 |
| 9,158,536 B2* | 10/2015 | Balasubramanian | | G06F 8/72 |
| 9,213,540 B1* | 12/2015 | Rickey | | G06F 8/71 |
| 9,223,546 B1* | 12/2015 | Chaffin | | G06F 8/20 |
| 9,665,433 B2* | 5/2017 | Grewal | | G06F 11/1448 |
| 9,678,982 B2* | 6/2017 | Flores | | G06F 17/302 |
| 9,684,802 B2* | 6/2017 | Srinivasan | | H04W 4/21 |
| 9,858,535 B2* | 1/2018 | Keith | | G06Q 10/00 |
| 9,923,890 B2* | 3/2018 | Hamburg | | G06F 21/335 |
| 2002/0188537 A1 | 12/2002 | Leeds et al. | | |
| 2003/0200532 A1* | 10/2003 | Gensel | | G06F 8/36 717/120 |
| 2005/0138603 A1* | 6/2005 | Cha | | G06F 8/53 717/120 |
| 2006/0005163 A1* | 1/2006 | Huesken | | G06F 9/465 717/107 |
| 2006/0200371 A1* | 9/2006 | Spector | | G06N 5/00 706/45 |
| 2007/0022126 A1* | 1/2007 | Wulfert | | G06F 17/30091 |
| 2007/0033567 A1* | 2/2007 | Carlson | | G06F 8/36 717/100 |
| 2007/0240102 A1* | 10/2007 | Bello | | G06F 8/36 717/104 |
| 2008/0065750 A1* | 3/2008 | O'Connell | | H04L 41/12 709/223 |
| 2008/0178147 A1* | 7/2008 | Meliksetian | | G06F 8/36 717/107 |
| 2008/0183514 A1* | 7/2008 | Moulckers | | G06F 8/36 705/304 |
| 2009/0234864 A1* | 9/2009 | Ellis | | G06F 17/30864 |
| 2009/0299881 A1 | 12/2009 | Del Rosario et al. | | |
| 2010/0037164 A1* | 2/2010 | Morrison | | G06F 8/36 715/765 |
| 2010/0333083 A1* | 12/2010 | Chancey | | G06F 8/36 717/174 |
| 2011/0119223 A1* | 5/2011 | Lane | | G06F 8/36 706/50 |
| 2011/0179396 A1* | 7/2011 | Hamilton, II | | G06F 8/36 717/100 |
| 2013/0254738 A1 | 9/2013 | Chaar et al. | | |
| 2015/0326567 A1* | 11/2015 | Hamburg | | G06F 21/335 713/155 |
| 2017/0286456 A1* | 10/2017 | Wenzel | | G06F 17/30294 |

OTHER PUBLICATIONS

Promtaveepong et al; Process Definition for Reuse Asset Management Process for Software Detailed Design, Electrical Engineering/Electronics, Computer, Telecommunications and Information Technology (ECTI-CON), 2013 10th International Conference on. IEEE, 2013.

Apendix P, 2016.

* cited by examiner

MANAGING REUSE OF ASSETS IN A WORKFLOW MANAGEMENT SYSTEM

TECHNICAL FIELD

The present invention relates generally to a method, system, and computer program product for reusing assets in workflow management system. More particularly, the present invention relates to a method, system, and computer program product for managing reuse and evaluation of assets in a workflow management system.

BACKGROUND

Within the scope of the illustrative embodiments, the workflow of a software development process comprises development or coding of computer usable software, testing of computer usable software, troubleshooting of computer usable software, maintenance of computer usable software, or update of computer usable software. A task refers to a specific step performed during the process, such as testing of computer usable software in software development. Hereinafter, unless expressly disambiguated where used, an "asset" is any reusable portion of—computer usable code, a previously performed task, a role or a user participating in a previously performed task, a solution developed in a previously performed task, a method applied in a previously performed task, a workflow or steps employed in a previously performed task, or some combination thereof.

Presently, one type of asset that is saved for future reuse is computer usable code or code fragment. When saved, the reusable code is stored in a code repository. A user intending to reuse the code extracts the code from the repository and uses the code as the user sees fit for the user's task. The user may or may not place any modifications to the extracted code back into the repository. Even when the modified code is placed back in the repository, rarely does any additional information, such as feedback or frequently asked questions, remain associated with the code.

SUMMARY

The illustrative embodiments provide a method, system, and computer program product. An embodiment includes a method that determines a category of a task being planned at a given time. The embodiment identifies a collection of assets, wherein the collection has been used in a similar task at a past time. The embodiment extracts into a set of encapsulated experience reports, an experience report associated with an asset in the collection, wherein the experience report was generated from the similar task at the past time. The embodiment computes, using a processor and a memory, a degree of usability corresponding to the collection, the collection being applicable to the category of the task up to the degree of usability. The embodiment positions, according to the degree of usability of the collection, the collection in a sorted list of reusable assets. The embodiment selects a reusable asset from the sorted list for use in the task.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
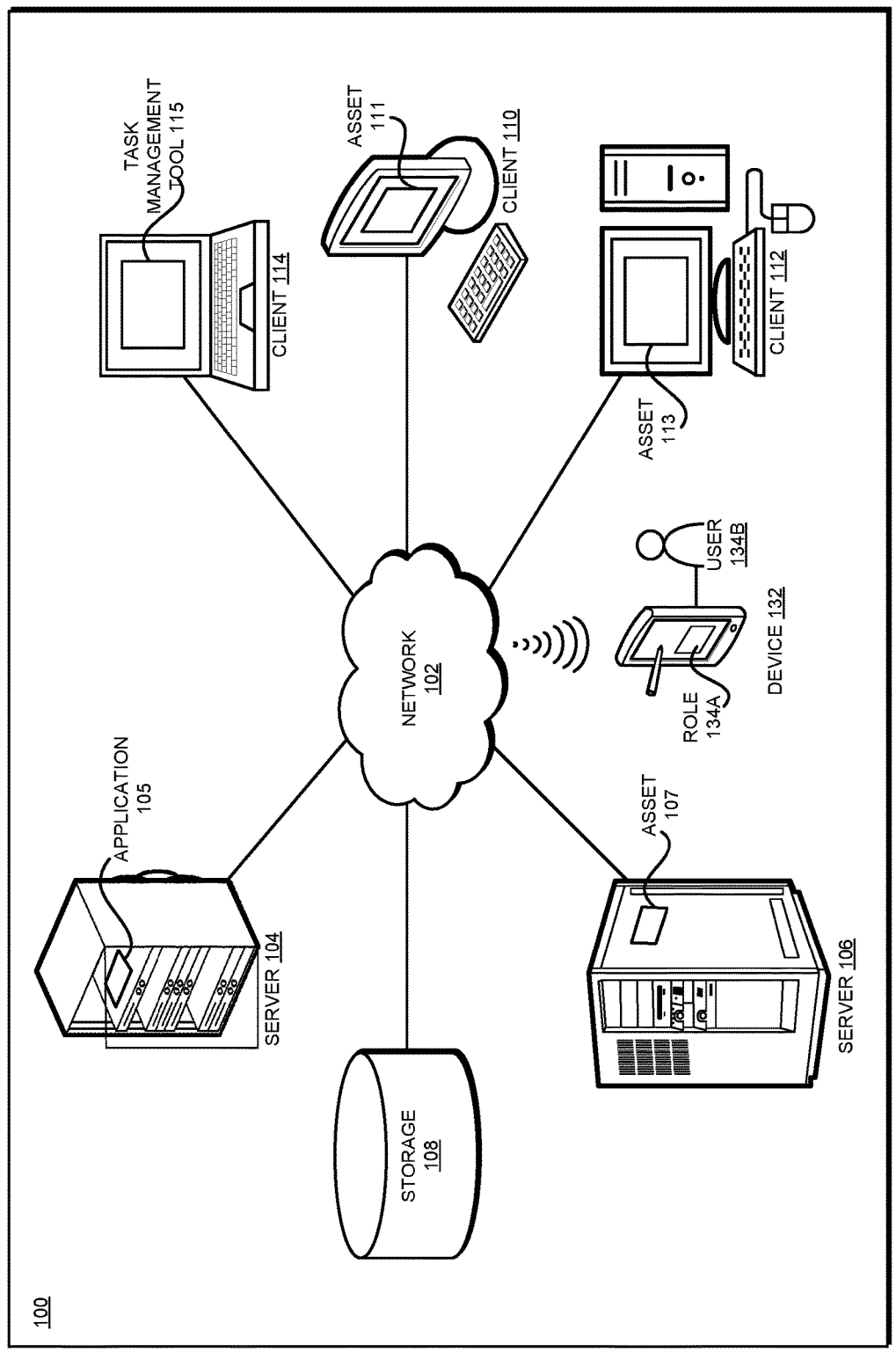
FIG. 1 depicts a block diagram of a network of data processing systems in which illustrative embodiments may be implemented.

The illustrative embodiments recognize that presently, in most cases concerning software development workflows, a code fragment that its deemed reusable is harvested for reuse as an after-thought. Generally, when a development project finishes, harvesting any aspect of the development effort for reuse is often overlooked, or accomplished with minimal expense of time and effort. Whatever code is harvested for reuse is generally left in a skeletal form with little to no information to guide the reuse of the code in future tasks.

The illustrative embodiments further recognize that even when a code fragment is available for reuse, the reusing of existing code is viewed as an effort-intensive, governance-heavy, and uncertainty-ridden proposition. The lack of accompanying information to facilitate the reuse is a big reason for this view.

The illustrative embodiments recognize that in enterprises where reuse is encouraged, the reusable code fragments quickly grow in numbers and become unmanageable. When the volume of reusable code fragments is coupled with the lack of associated information to guide future reuse of the code fragments, the reuse effort is quickly defeated due to unmanageability, effort-intensiveness, governance-heaviness, and uncertainty problems. Furthermore, the potential reusers presently do not know which of the plurality of assets have been successfully applied to specific categories of problems with which the reuser is currently engaged.

The illustrative embodiments recognize that reuse of any asset, not just code fragments, becomes desirable when the assets are managed in a way that the assets remain controllable by those who create them or are responsible for them. The reusability of an asset also benefits when sufficient information is associated with the asset to guide the suitability determination and other decisions pertaining to the asset in a future task. The illustrative embodiments further recognize that an agent responsible for executing a task is more likely to reuse an asset when it can be determined that the asset has been reused successfully with favorable reuse experience in a previous task of a similar type. The presently available methods of managing assets fail to solve these problems and therefore fail to promote the reuse of those assets in a given workflow management system.

The illustrative embodiments used to describe the invention generally address and solve the above-described problems and other problems related to reusing a variety of assets in work flow driven processes such as software development.

An embodiment can be implemented as a software application. The application implementing an embodiment can be configured as a modification of an existing task planning system, as a separate application that operates in conjunction with an existing task management tool or system, a stand-alone application, or some combination thereof.

Within the scope of the illustrative embodiments, an asset can be created, stored, or located anywhere in a given environment and need not be brought into a managed repository for facilitating reuse. For example, when the asset is a code fragment, that code fragment can reside on any computer, in any storage, with or without the benefit of a code management library-type facility. As another example, when the asset is all or a portion of the result of a task, whether in plan, in progress, or previously performed, information of that task can reside in any suitable task management system anywhere in the given workflow management system. As another example, when the asset is all or a portion of a previously developed solution, method, or workflow, information of that solution, method, or workflow can reside in any suitable system anywhere in the given workflow management system.

An embodiment maintains a reference to an asset. A reference to an asset is an identifier, locator, pointer, or handle, which can be used to reach the asset at a location where the asset is normally stored or situated.

An embodiment maintains a set of experience reports with an asset. An experience report is a compilation of information in any suitable form or structure, where the information is indicative of a time when the asset was previously used in a task, a reason why the asset was chosen for a previous task, an actual manner in which the asset was used or reused in the previous task, an evaluation of the asset's suitability observed in the previous task on a scale, a notation of an aspect of the asset that was reused advantageously in the previous task, a notation of an aspect of the asset that could not be reused advantageously in the previous task, a modification performed relative to the asset to enable the reuse of the asset in the previous task, a modification that is recommended relative to the asset to enable the reuse of the asset in a future task, questions, positive and negative comments, issues that should be resolved with the asset, recommendations for improvements in the asset, alternatives that could be used or executed instead of the asset, or some combination thereof.

Note that a previous task can be any task prior to a task in which the reuse of the asset is contemplated. A future task can be the task in which the reuse of the asset is contemplated, or generally, any task that has not yet used the asset after the asset's use in a previous task.

An embodiment enables a task to add or update an experience report associated with an asset when an input accepts the asset for reuse in the task, accesses the asset using a reference to the asset, and associates the referenced asset with the task. An embodiment collects information of any of the types described herein during the use of the asset in the task. For example, if the asset is modified during the reuse in the task, the embodiment prompts, requests, or otherwise obtains information to be added to an experience report of the asset. As a non-limiting example, the information can be about the modification, the suitability of the asset, a changed aspect of the asset, an advantage or a disadvantage that caused the modification, or a recommendation for further modification of the asset.

An embodiment uses the sets of experience reports associated with various reusable assets to select an asset for a task. Each reusable asset is categorized into one or more categories. A category associated with an asset is a category of a task in which the asset is usable. A category of a task is a class or type of a function to be performed in the task, an operation to be performed by the task, a goal to be achieved by the task, and the like.

As a non-limiting example, an embodiment determines one or more categories associated with the task for which reusable assets have to be located in the workflow management system. For example, a task may be to produce software that performs data storage management using data input and output functions, storage cleanup, data backup, and many other functions. One or more categories that could be determined for the task may include, data storage management, data input, data output, storage cleanup, and data backup.

An embodiment determines a category of the asset by analyzing one or more experience reports associated with the asset. For example, if according to an experience report from a previous task, the asset was used in a task of category—data input, the asset is categorized in the data input category. Any suitable manner of analyzing the available experience reports can be used to determine an asset category. For example, a value of a parameter in a structured experience report can be used, translated, or mapped to a category. As another example, a parse of unstructured experience report data using Natural Language Processing (NLP) can be used to determine a category for the asset.

These examples of methods for determining an asset category are not intended to be limiting. From this disclosure, those of ordinary skill in the art will be able to conceive many other methods for determining a category for the asset, and the same are contemplated within the scope of the illustrative embodiments.

Any number of categories can be associated with an asset. As new experience reports become associated with the asset, an existing experience report is revised, or some combination thereof, an embodiment reanalyzes the experience reports to determine a new category, change an existing category, or remove an old category associated with the asset. The categorization of an asset is therefore dynamic, and changes with the reuse in which the asset participates.

Furthermore, an embodiment computes a priority of the asset in a category. For example, an asset may be categorized in three different categories. The experience reports of the asset may show that the asset was successfully reused without much modification in a task of the first category. The experience reports of the asset may show that an aspect of the asset was successfully reused without much modification but another aspect has to be modified in a task of the second category. The experience reports of the asset may also show that the reuse of the asset was unsuccessful in a task of the third category, and the reuse required significant modifications to the asset to make it work in the task.

A priority of an asset in a category is indicative of a degree of fit or usability of the asset in the category. By analyzing such an example collection of experience reports, an embodiment determines that the priority, or degree of usability, or degree of fit, of the asset in the first category is greater than in the second and third categories, the least fitting category being the third category for the asset.

As another example manner of determining a priority of an asset (X) in a category assume that there are twenty experience reports of asset X that are related to category A, ten experience reports related to category B, and three experience reports related to category C. Given that more tasks of category A have used the asset than tasks of category B or C, the embodiment determines that the asset has a higher priority in category A, next lower priority in category B, and least priority in category C.

Now, further assume that an asset Y also exists in category A with thirty associated experience reports in category A; and an asset Z also exists in category C with one associated experience report in category C. Under these example circumstances, asset X would be prioritized lower that asset Y in category A but higher than asset Z in category C.

Consider another non-limiting example—a task of a certain type costs n units, and generates m units of revenue. The task uses certain assets. Asset 1 may help reduce the cost of the task from n to k. Asset 2 may help reduce the number of future tasks of that certain type. In one example implementation of the prioritization function used in the analysis of an embodiment, the implementation may cause the embodiment to prioritize asset 2 higher than asset 1. Depending upon the implementation, another implementation may use a different prioritization function and cause the embodiment to prioritize asset 1 higher than asset 2.

These examples of manners of determining a priority of an asset are not intended to be limiting. From this disclosure, those of ordinary skill in the art will be able to conceive many other ways in which to make similarly purposed determinations and the same are contemplated within the scope of the illustrative embodiments.

An embodiment facilitates the reuse of assets in future tasks as follows—the embodiment receives information about a task, e.g., from a task management tool. In a task mapping operation, the embodiment determines a category of the task. In other words, the embodiment maps the task to one or more categories of tasks. New categories may be created during the task mapping process.

The embodiment determines assets that are categorized in that category. The embodiment arranges the assets in that category according to their respective priorities. The embodiment presents the sorted prioritized list of assets to the task management tool. The list includes references to the assets, wherever they might be located. The task management tool is also presented with the experience reports of the assets in the list so that the task planner can review the experience reports if needed.

The task management tool provides an input to the embodiment for selecting an asset from the list. Upon the input, the embodiment associates the selected asset for reuse in the task. The embodiment enables the task to add or modify an experience report of the asset from the time of the association up to and even after the time when the task is complete or up to some time prior to the completion of the task, as suitable in a particular implementation of the embodiment.

Thus, the reuse of an asset also modifies the asset in at least one or both of two ways—first, because the experience reports are a part of the reusable asset, addition or manipulation of an experience report of an asset during a reuse comprises modifying the asset; and second, an asset can be modified during the reuse—e.g., a portion of a code fragment asset can be changed—which also comprises modifying the asset. When a reused asset changes, e.g., because one task that is reusing the asset may have added an experience report, another task that is reusing the asset is notified of the changes. Such a notification helps the other task, and generally any number of tasks that may be reusing an asset to reevaluate their reuse in view of the changes made to the asset.

A task may use several assets. When presented with information about a task being planned, the embodiment determines from the experience reports of the various assets whether a set or collection of the assets has previously participated in a similar task. If a previous task similar to the task being planned has used a collection of assets, the embodiment selects that collection of assets. The embodiment further isolates experience reports created during the similar previous task for each participating asset in the collection. The experience reports isolated in this manner form encapsulated experience reports.

The embodiment represents the collection of assets and their experience reports as an encapsulated asset. The encapsulated asset has the encapsulated experience reports associated therewith.

The embodiment may find more than one collections that may have participated in different instances of similar previous tasks. Thus, the embodiment may create multiple encapsulated assets and their corresponding encapsulated experience reports. The embodiment determines the priorities of encapsulated assets in a manner similar to determining the priority of an asset, i.e., by analyzing the encapsulated experience reports of the encapsulated asset.

Once the priorities of the several encapsulated assets has been determined, the embodiment presents the encapsulated asset, their corresponding encapsulated experience reports, their priorities, arranged in an order according to their priorities for selection in a task in a manner similar to presenting the assets for selection. Thus, a task management tool can select an individual asset for reuse, a collection of assets for reuse, or some combination of both, depending on the requirements of the task.

A method of an embodiment described herein, when implemented to execute on a device or data processing system, comprises substantial advancement of the functionality of that device or data processing system in reusing existing assets in a workflow management system. For example, presently available methods are suitable only for limited types of assets and require those types of assets to be deposited in a managed repository from where they can be extracted for reuse. The repository does not keep additional information associated with the assets that may be useful in making a reuse decision with respect to an asset. An embodiment of this invention provides a method for reusing an asset in-situ, i.e., from wherever the asset may be located in a workflow management system. The embodiment also keeps as a part of the asset a set of experience reports which is useful in a reuse decision making process with respect to the asset. An embodiment further creates an encapsulated asset from a collection of assets used in various previous tasks. The encapsulated asset has a set of encapsulated experience reports associated therewith. An embodiment thus enables a future task to select an entire collection of reusable assets that was used in a similar previous task. This manner of managing reuse of assets in a workflow management system is unavailable in the presently available methods. Thus, a substantial advancement of such devices or data processing systems by executing a method of an embodiment is in increasing informed reuse of a variety of types of assets in a workflow management system.

The illustrative embodiments are described with respect to certain types of assets, locations, references, times, experience reports, categories, priorities, tasks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or their architectures, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
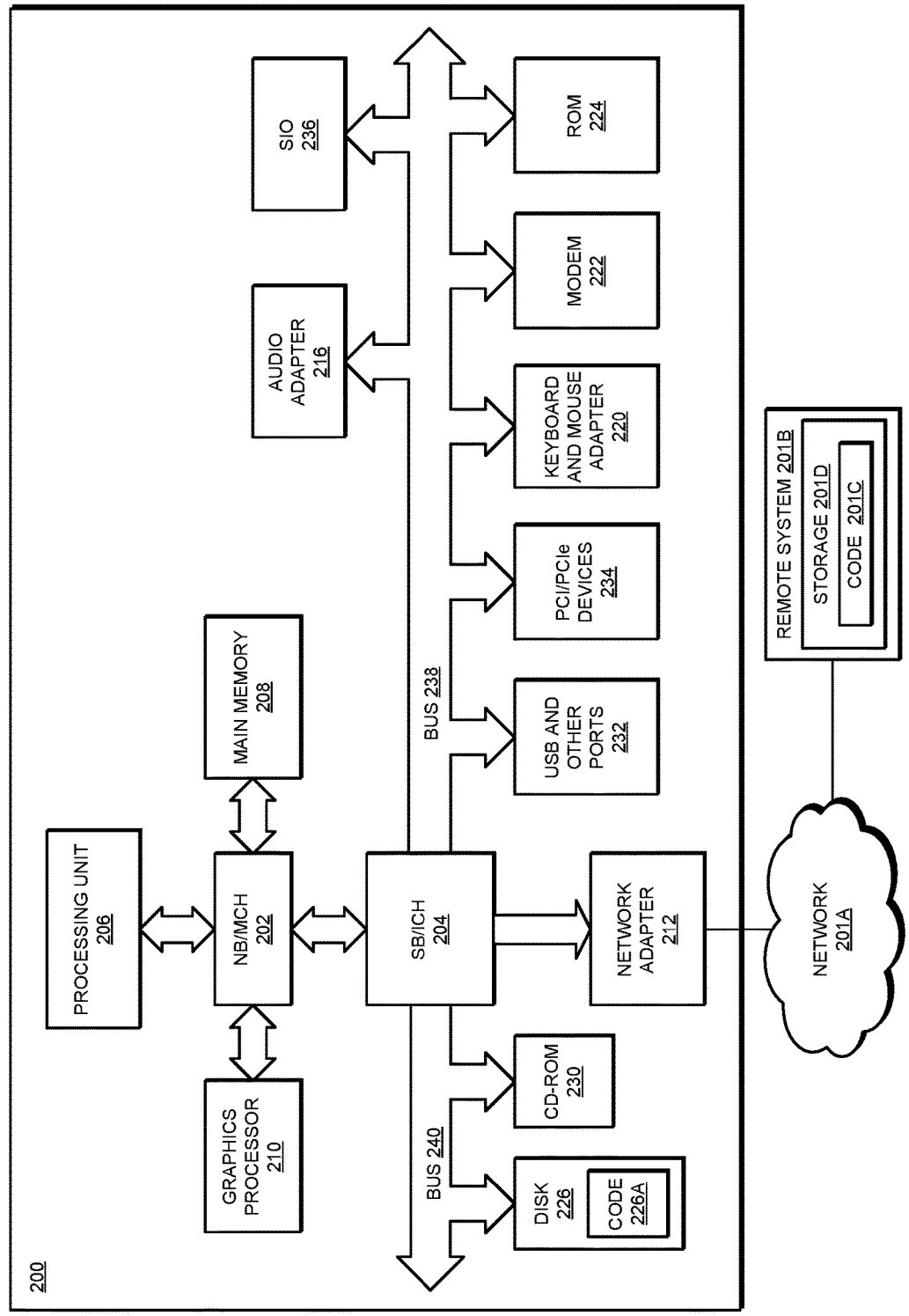
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. As some non-limiting examples, asset 107 may be an implementation of a workflow-type of an asset; asset 111 may be code-type of an asset; and asset 113 may be a previously performed task, solution, or method-type of an asset. Another example asset may be formed using role 134A associated with user 134B of device 132. Task management tool 115 plans a future task in which one or more assets described herein are to be reused.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
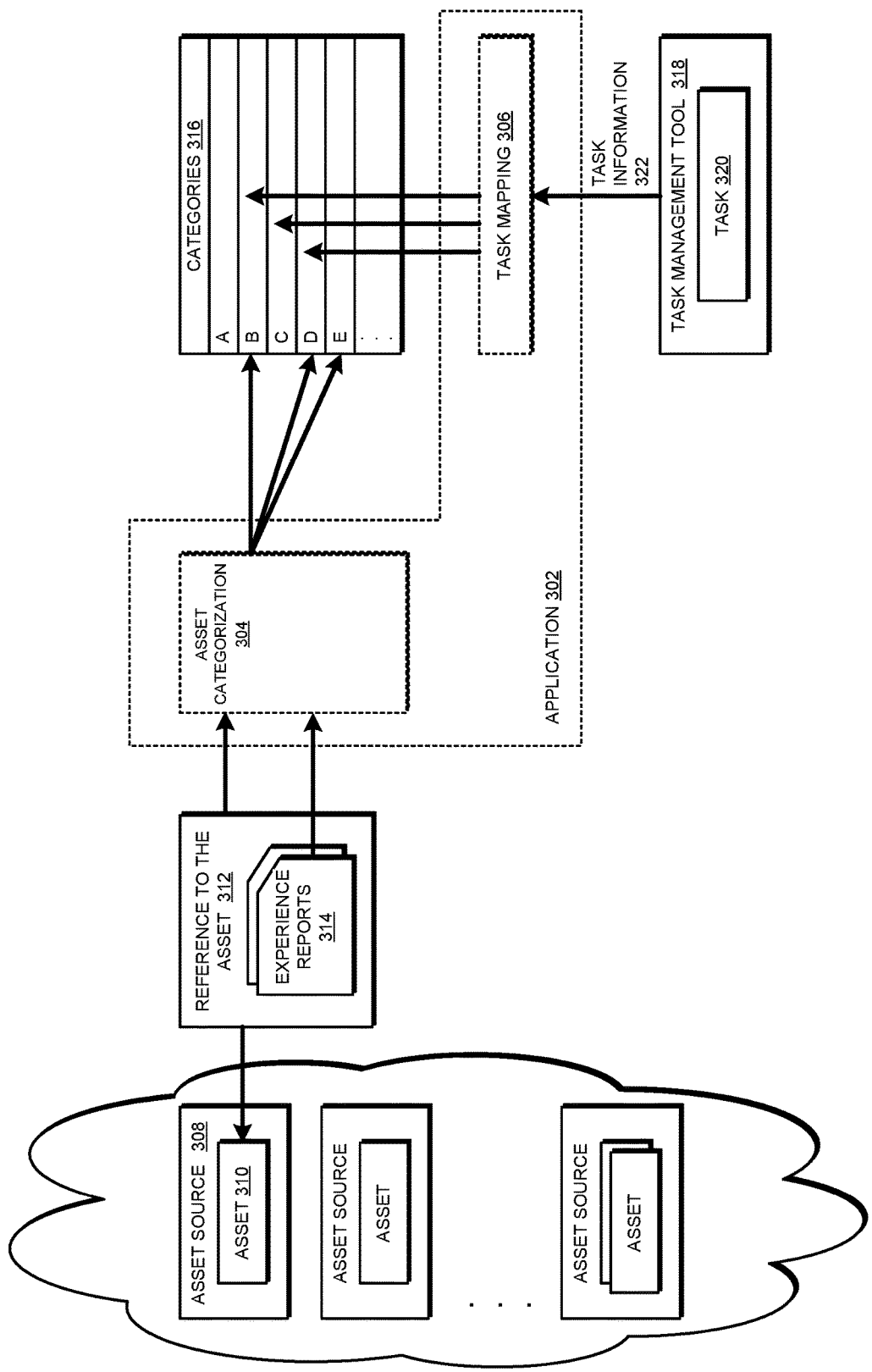
FIG. 3 depicts a block diagram of an example configuration for managing reuse of assets in a workflow management system in accordance with an illustrative embodiment.

With reference to FIG. 3, this figure depicts a block diagram of an example configuration for managing reuse of assets in a workflow management system in accordance with an illustrative embodiment. Application 302 is an example of application 105 in FIG. 1. Components 304 and 306 are parts of application 302.

Asset source 308 is an example of any of data processing systems 107, 110, 112, or 132 in FIG. 1. Asset source 308 is a storage other than a managed store or a managed library of assets. Asset 310 is a reusable asset stored in asset source 308. Any number of asset sources may be available in a given workflow management system, and each such source may share or make available any number and types of reusable assets therefrom as depicted.

Assume, only as a non-limiting example, that asset 310 is a code type asset. Application 302 constructs reference 312 to asset 310. Reference 312 does not move asset 310 into a managed store or library, but leaves asset 310 at its original location in source 308.

Application 302 also associates with reference 312 a set of experience reports 314. Component 304 analyzes experience reports 314 corresponding to asset 310 to determine one or more categories of asset 310. Assume only as a non-limiting example that list 316 is a current listing of categories according to the tasks that are being performed or have been performed in the workflow management system. Further assume that list 316 includes a number of example categories A, B, C, D, E, and so on.

Component 304 analyzes one or more of experience reports 314 to map asset 310 to one or more categories in list 316. For example, component 304 maps asset 310 to example categories B, D, and E as depicted.

Task management tool 318 is an example of task management tool 115 in FIG. 1. Assume that tool 318 is planning task 320, which has to be performed in the workflow management system. Tool 318 supplies task information 322 to component 306. Using task information 322, component 306 performs a task mapping operation in which task 320 is mapped to one or more categories in list 316. Task 320 may be mapped to an existing category, to a new category (not shown) created for task 320, or some combination thereof. As a non-limiting example, suppose that task 320 is mapped to existing categories B, C, and D, in list 316.

Up to this point in the process, application 302 has sufficient information to determine that asset 310 should be reusable in task 320 at least because of common categories B and D to which asset 310 and task 320 both map. A process according to an embodiment to determine whether asset 310 has a sufficient degree of usability in task 320—e.g., greater than a threshold degree of usability in task 320—is described with respect to FIG. 4A.

Figure 4A:
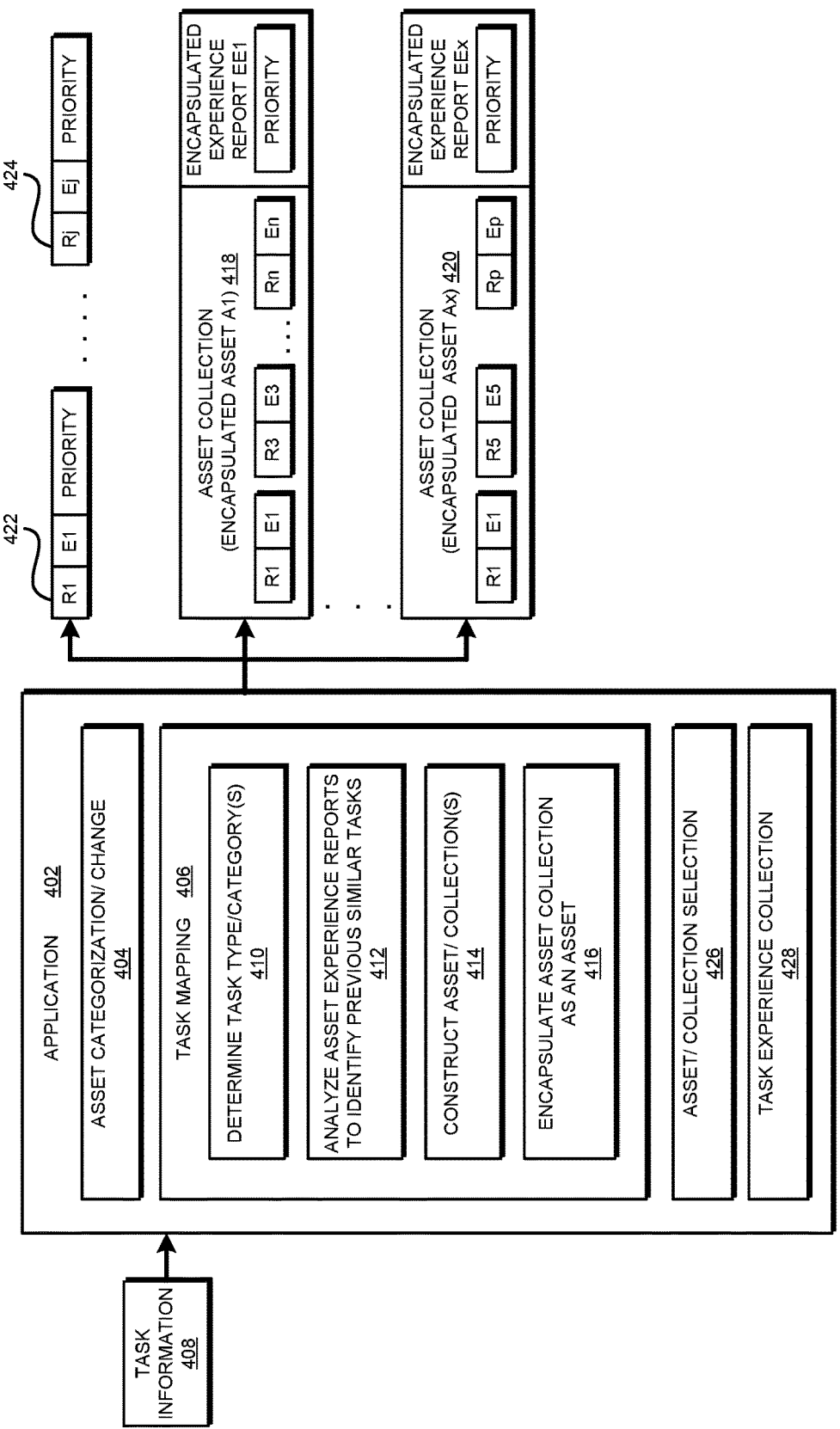
FIG. 4A depicts a block diagram of a method for managing reuse of assets in a workflow management system in accordance with an illustrative embodiment.

With reference to FIG. 4A, this figure depicts a block diagram of a method for managing reuse of assets in a workflow management system in accordance with an illustrative embodiment. Application 402 is an example of application 302 in FIG. 3. Component 404 is an example of component 304, and component 406 is an example of component 306 in FIG. 3. Task information 408 is an example of task information 322 in FIG. 3.

Component 404 performs categorization of a reusable asset using one or more experience reports associated therewith, in a manner described herein. Upon receiving task information 408, component 406 performs a task mapping operation.

Specifically, subcomponent 410 determines one or more categories corresponding to the task of information 408. In some cases, a task management tool, such as tool 318 in FIG. 3, may provide one or more category identifiers with information 408. In some other cases, information 408, e.g., a task specification, can be analyzed to determine a category of the corresponding task.

Subcomponent 412 analyzes the experience reports associated with various reusable assets to identify previously performed tasks that were similar to the task of information 408 according to some similarity factor. Some non-limiting example similarity factors to regard two tasks as similar include, performing a similar function or operation in the workflow management system, performing a similar function or operation in a software product, participating in the same or similar software product or development plan, performed or created by the same user or team, using same or similar software or hardware resources in the workflow management system, using the previous task to build the future task, and many others.

If subcomponent 412 identifies a previous task that is similar to the task of information 408, subcomponent 414 constructs an asset collection from the reusable assets that were used in the similar previous task. If more than one similar previous tasks are found, more than one collection can be created. In some cases, it may be possible to construct more than one collection from a single similar previous task.

When subcomponent 414 produces an asset collection, subcomponent 416 encapsulates the collection into an asset form. The encapsulated asset includes all the reusable assets in the collection and a set of encapsulated experience reports as described herein.

Asset collections 418 (A1) through 420 (Ax) are examples of asset collections encapsulated in this manner. For example, if a collection identified by subcomponent 414 includes asset R1, that asset R1 together with all, some, or none of its corresponding experience reports (E1) is included in encapsulated asset A1, which represents the collection. Note that experience reports in E1 are separate from and in addition to any experience reports that may be extracted from the experience reports of R1 and included in encapsulated experience reports of A1 (EE1). EE1 pertain to the usage of the collection in the similar previous task. In this manner example A1 comprises R1-E1, R3-E3, . . . , Rn-En, and EE1, where R1, R3, . . . , Rn are example assets from the collection. Similarly, if another collection is identified, corresponding encapsulated asset (Ax) comprises R1-E1, R5-E5, . . . , Rp-Ep, and encapsulated experience reports of Ax (EEx), where R1, R5, . . . , Rp are example assets from the other collection.

A priority of an encapsulated asset, e.g., of A1 or Ax, can be computed using their respective encapsulated experience reports, e.g., EE1 or EEx, respectively, in a manner described herein. The computed priority can be associated with the encapsulated asset. Furthermore, a separate experience report can be associated with the asset collection itself, such that collections can be recursively nested and evaluated/prioritized with respect to each other in the context of the category of tasks within which they are typically used. The priority computation can be configured to take into account such separate experience reports in a manner similar to EE1 or EEx as described herein.

Alternatively, when subcomponent 412 identifies distinct reusable assets—whether in lieu of or in addition to a collection of reusable assets—subcomponent 414 computes their priorities for their respective categories. For example, asset 422 may be asset R1 together with its corresponding set of experience reports (E1), and a computed priority for each of one or more categories in which asset R1 can be categorized. Similarly, any number of individual assets may be identified, e.g., asset 424 may be asset Rj together with its corresponding set of experience reports (Ej), and a computed priority for each of one or more categories in which asset Rj can be categorized.

Depending on the particular use-case, application 402 outputs prioritized assets 422-424, prioritized encapsulated assets 418-420, or some combination thereof to the task management tool that supplied information 408. The tool provides a selection input, which selects one or more of the outputs, for example, some combination of outputs 418-420 and 422-424. Component 426 detects or receives the selection. Component 426 enables the task being planned in the tool, or causes the tool to enable the task, to become associated with the selected asset or assets in a selected collection/encapsulated asset.

Component 428 begins collecting experience data from the task about an asset associated with the task. Component 428 adds or modifies, or enables the addition or modification of, the experience reports of the associated asset using the collected experience data.

Component 404 which initially categorized an asset dynamically detects any changes to the experience reports that form the basis of the categorization. The addition or modification of an experience report of an asset thus causes component 404 to re-evaluate the asset categories, and may cause component 404 to dynamically change or recategorize the asset.

Figure 4B:
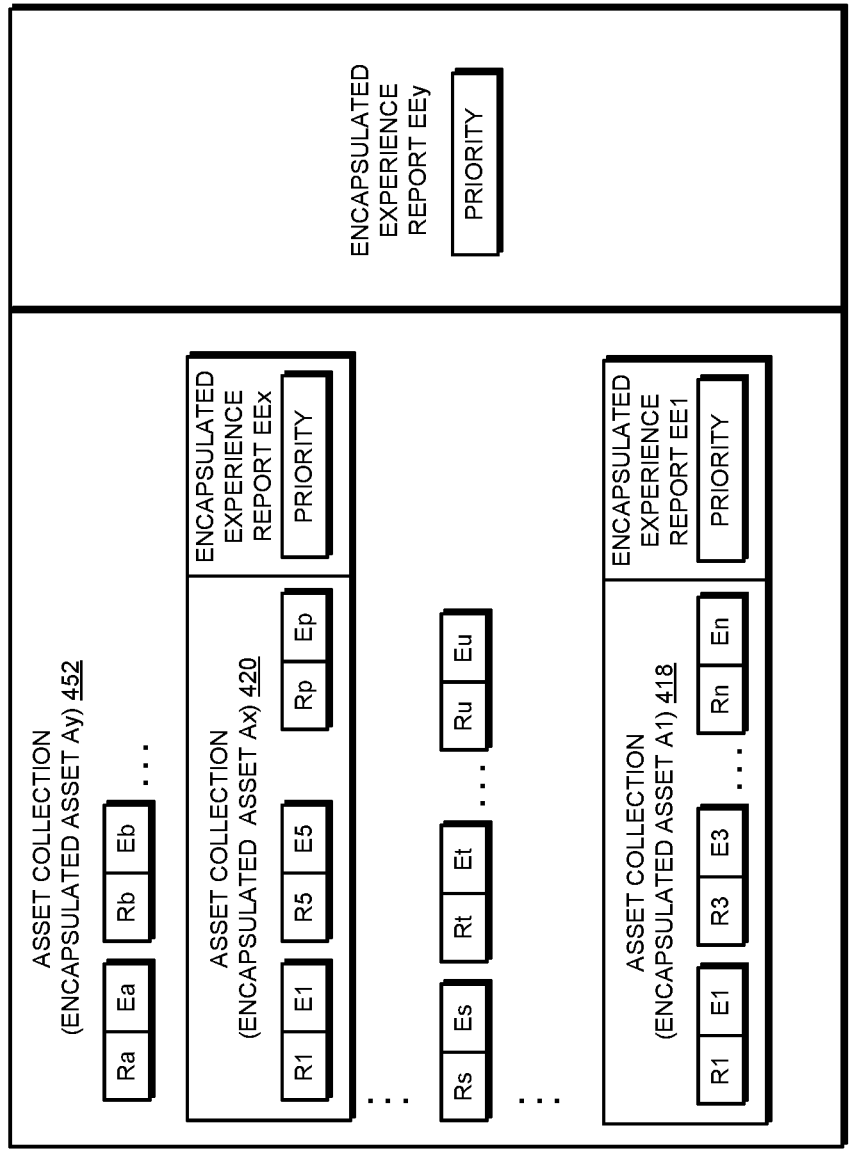
FIG. 4B depicts a block diagram of a nested encapsulated asset in accordance with an illustrative embodiment.

With reference to FIG. 4B, this figure depicts a nested encapsulated asset in accordance with an illustrative embodiment. Asset collection 452 (Ay) can be output from application 402 of FIG. 4A in a manner similar to asset collections 418 (A1) through 420 (Ax).

For example, encapsulated asset Ay may include any number of individual assets e.g., asset Ra, together with all, some, or none of its corresponding experience reports (Ea). [Rb, Eb], [Rs, Es], [Rt, Et], and [Ru, Eu] are some more individual assets and some or all of their experience reports are similarly included in encapsulated asset Ay.

Encapsulated asset Ay may also include other encapsulated assets. In other words, just as an individual asset can be included in an encapsulated asset, an encapsulated asset can be treated as just another asset and nested within another encapsulated asset. In the depicted example, Ay 452 is shown to have nested therein encapsulated assets A1 418 and Ax 420 of FIG. 4A. Any number of assets and encapsulated assets can be nested in this manner, and any number of nesting levels can be created within the scope of the illustrative embodiments. As described with respect to FIG. 4A, the experience reports of Ay (EEy) are separate from and in addition to any experience reports that may be extracted from the experience reports of an included individual or encapsulated asset. EEy pertain to the usage of the Ay collection in a similar previous task.

Figure 5:
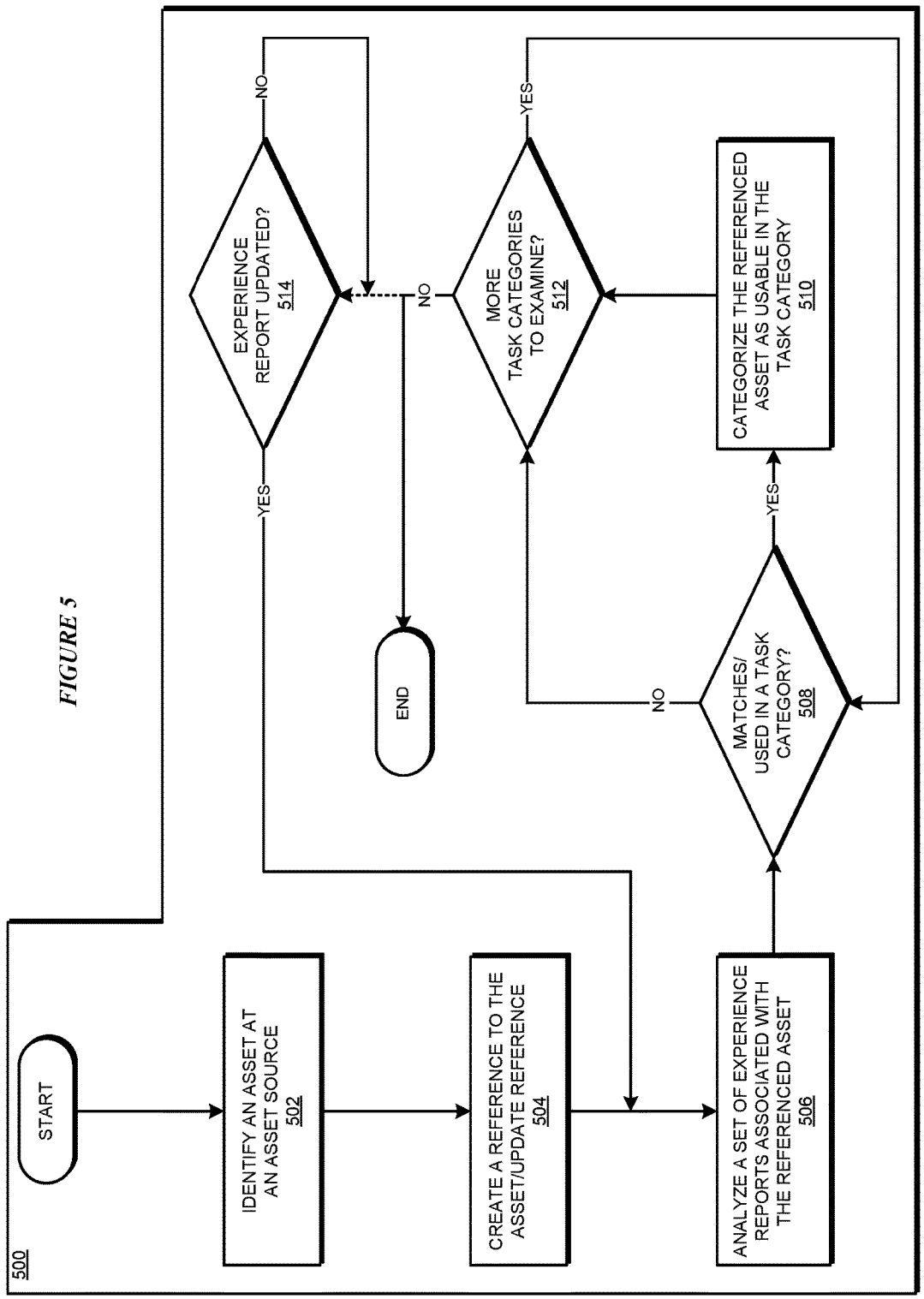
FIG. 5 depicts a flowchart of an example process for categorizing a reusable asset in accordance with an illustrative embodiment.

With reference to FIG. 5, this figure depicts a flowchart of an example process for categorizing a reusable asset in accordance with an illustrative embodiment. Process 500 can be implemented in application 402 in FIG. 4A.

The application identifies an asset at an asset source (block 502). The application creates or updates a reference to the asset (block 504). The application analyzes a set of experience reports associated with the referenced asset (block 506).

The application determines whether an analysis of an experience report indicates that the asset has been previously used in a category of tasks (block 508). If the asset has been previously used in a category of tasks ("Yes" path of block 508), the application categorizes the asset into the category (block 510). If the asset has not been previously used in a category of tasks ("No" path of block 508), the application proceeds to block 512.

The application determines whether the experience reports of the asset have to be analyzed against more task categories (block 512). If the experience reports of the asset have to be analyzed against more task categories ("Yes" path of block 512), the application returns to block 508 and evaluates another task category. If the experience reports of the asset do not have to be analyzed against more task categories ("No" path of block 512), the application may end process 500 thereafter.

Alternatively, the application may continue examining the experience reports of the asset to determine whether an experience report has been added, deleted, or updated (block 514). If no experience report of the asset is added, deleted, or updated ("No" path of block 514), the application may continue examining the experience reports for additions, deletions, or updates. If or when an experience report of the asset is added, deleted, or updated ("Yes" path of block 514), the application returns process 500 to block 506 for a re-analysis.

Figure 6:
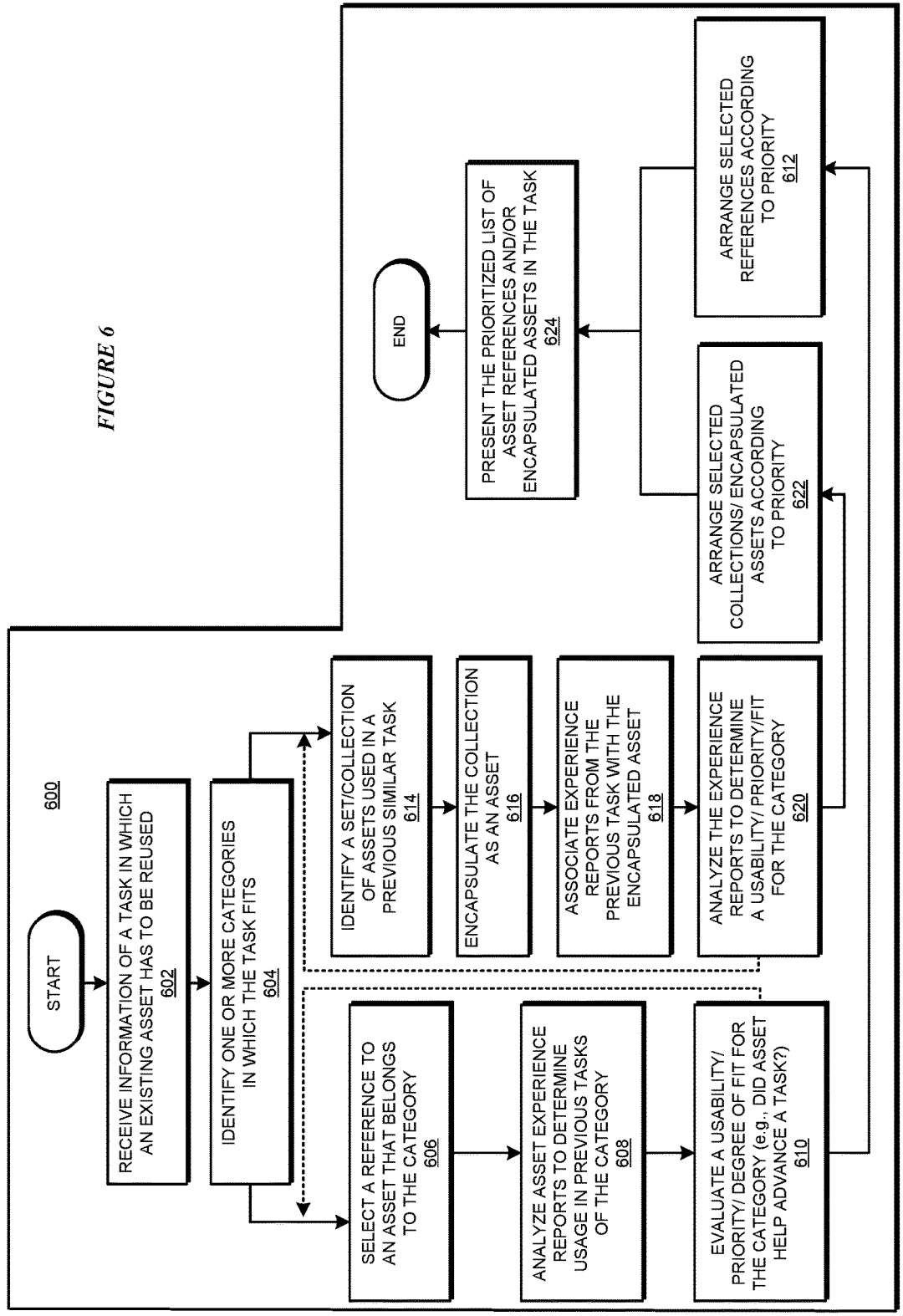
FIG. 6 depicts a flowchart of an example process for associating reusable assets with a task in accordance with an illustrative embodiment.

With reference to FIG. 6, this figure depicts a flowchart of an example process for associating reusable assets with a task in accordance with an illustrative embodiment. Process 600 can be implemented in application 402 in FIG. 4A.

The application receives information about a task in which an existing asset has to be reused (block 602). The application identifies one or more categories applicable to the task (block 604). The application then follows one or both of two paths in process 600.

According to one path, the application selects a reference to an asset that has been categorized in a category of the task (block 606). The application analyzes the experience reports of the asset to determine usage of the asset in previous tasks of a similar category (block 608). Using the result of the analysis, the application evaluates a priority, degree of usability, or degree of fit of the asset in the category (block 610).

The application repeats blocks 606-610 any number of times as may be needed depending on the number of assets and the number of categories that have to be evaluated in this manner until such time as the associated task is deemed complete by the user. The application arranges the references to the evaluated assets according to their respective priorities (block 612). The application may execute the other path of process 600 or proceed to block 624 thereafter.

According to the other path through process 600, the application identifies a set or a collection of assets that was used in a previous similar task (block 614). The application encapsulates the collection as an encapsulated asset (block 616). The application associates experience reports from the previous similar task with the encapsulated asset, forming encapsulated experience reports (block 618). The application analyzes the encapsulated experience reports to determine a priority, degree of usability, or degree of fit of the asset in a category of the task being planned (block 620).

The application repeats blocks 614-620 any number of times as may be needed depending on the number of collections and the number of categories that have to be evaluated in this manner until such time as the associated task is deemed complete by the user. The application arranges the encapsulated assets according to their respective priorities (block 622). The application proceeds to block 624 thereafter.

The application presents the prioritized list or lists of asset references, encapsulated assets, or some combination thereof for selection in the task (block 624). The application ends process 600 thereafter.

In one embodiment, the presentation at block 624 occurs in response to receiving a request to view a recommendation—e.g., a recommended task—in a task management tool. In response to such a request, the application displays or otherwise presents, at block 624, the experience reports of assets related to the recommendation, thereby allowing a user to view all of the experiences that users have had with an asset while executing the recommended task.

In one embodiment, the presentation at block 624 occurs in response to receiving a request to view a task in a task management tool. In response to such a request, the application displays or otherwise presents, at block 624, the experience reports of assets related to the task, thereby allowing a user to view all of the experiences that users have had with an asset while executing the task.

Furthermore, when an asset related to a recommendation or task are presented at block 624, one embodiment presents the assets as and where they are located in the data processing environment. For example, different assets may be located across different computers in the data processing environment, and when a user requests to view an asset related to a recommendation or a task, the presentation from the embodiment allows the user to view that asset in the original environment of the asset.

Figure 7:
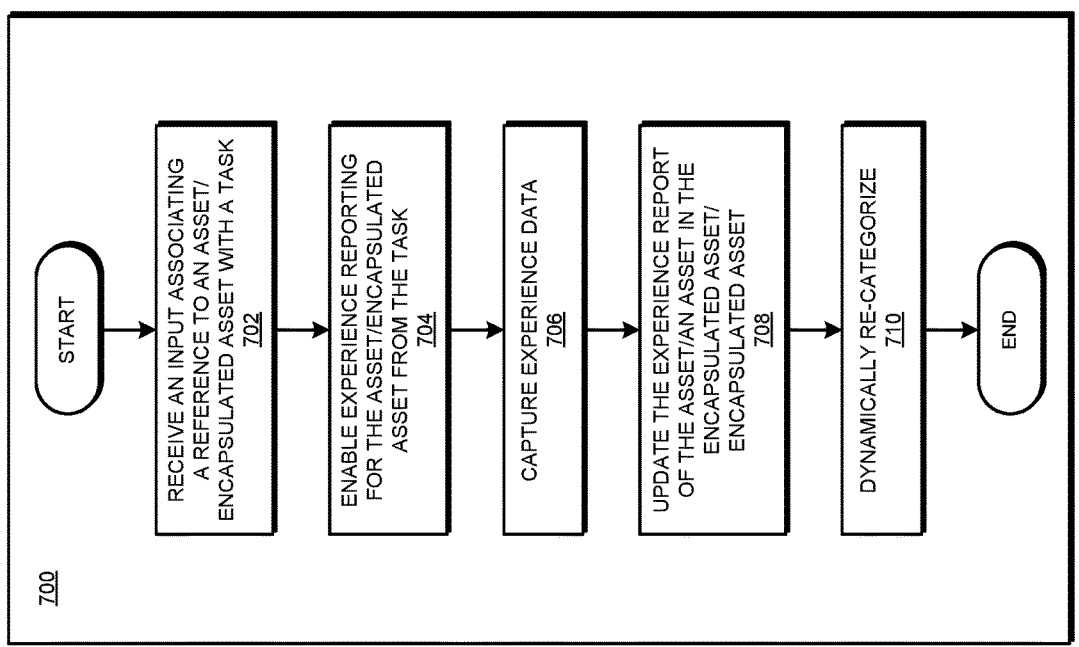
FIG. 7 depicts a flowchart of an example process for dynamic recategorization of reusable assets in accordance with an illustrative embodiment.

With reference to FIG. 7, this figure depicts a flowchart of an example process for dynamic recategorization of reusable assets in accordance with an illustrative embodiment. Process 700 can be implemented in application 402 in FIG. 4A.

The application receives an input associating a referenced asset or an encapsulated asset with a task (block 702). The application enables experience reporting for the asset or encapsulated asset from the task (block 704).

The application captures experience data from the task about the referenced asset, the encapsulated asset, or an asset in the encapsulated asset, as the case may be (block 706). The application adds, deletes, updates, or otherwise manipulates an experience report of the referenced asset, the encapsulated asset, or the asset in the encapsulated asset (block 708). The application dynamically recategorizes the referenced asset, the encapsulated asset, or the asset in the encapsulated asset based on the manipulated experience report (block 710). The application ends process 700 thereafter.

Thus, a computer implemented method, system or apparatus, and computer program product are provided in the illustrative embodiments for managing reuse of assets in a workflow management system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
determining, by a server, a category of a task being planned at a given time;
identifying a collection of assets stored in at least one data processing system in communication with the server, wherein the collection has been used in a similar task at a past time;
extracting into a set of encapsulated experience reports, an experience report associated with an asset in the collection, wherein the experience report was generated from the similar task at the past time;
computing, using a processor and a memory, a degree of usability corresponding to the collection in the category based upon the set of encapsulated experience reports, the collection being usable in the category of the task up to the degree of usability;
positioning, according to the degree of usability of the collection, the collection in a sorted list of reusable assets;
selecting a reusable asset from the sorted list for use in the task;
receiving, from the task, an update to an experience report associated with the selected reusable asset, the update forming an updated experience report;
reanalyzing a set of experience reports associated with the selected reusable asset to determine a category modification associated with the selected reusable asset, the category of the selected reusable asset being dynamic and changeable with respect to a reuse in which the selected reusable asset participates, the set of experience reports including the updated experience report; and recomputing a second degree of usability corresponding to the reusable asset, the reusable asset being usable in the category of the task up to the second degree of usability.

2. The method of claim 1, further comprising:
identifying a second reusable asset located in a workflow management system, wherein the second reusable asset is situated under a control of an owner of the second reusable asset, and wherein the second reusable asset is categorized in the category;
analyzing a set of experience reports associated with the second reusable asset, wherein an experience report in the set of experience reports of the second reusable asset was generated from a different previous task, wherein the different previous task also belonged to the category;
computing a second degree of usability corresponding to the second reusable asset, the second reusable asset being usable in the category of the task up to the second degree of usability;
positioning, according to the second degree of usability of the second reusable asset, the second reusable asset in a sorted list of reusable assets.

3. The method of claim 2, wherein the selected reusable asset is the second reusable asset.

4. The method of claim 1, wherein the selected reusable asset is the collection.

5. The method of claim 1, further comprising:
analyzing a task information associated with the task to identify a function performed by the task in a workflow management system; and
selecting the category wherein the category corresponds to the function performed by the task.

6. The method of claim 1, further comprising:
enabling the task to update an experience report associated with the selected reusable asset.

7. The method of claim 1, wherein the method is embodied in a computer program product comprising one or more computer-readable storage devices and computer-readable program instructions which are stored on the one or more computer-readable tangible storage devices and executed by one or more processors.

8. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

9. The method of claim 1, wherein the category modification includes at least one of determining a new category, changing an existing category, or removing an old category associated with the selected reusable asset.

10. A computer usable program product comprising one or more computer-readable storage devices, wherein the computer-readable storage devices are not transitory signals per se, and program instructions stored on at least one of the one or more storage devices, the stored program instructions comprising:
program instructions to determine, by a server, a category of a task being planned at a given time;
program instructions to identify a collection of assets stored in at least one data processing system in communication with the server, wherein the collection has been used in a similar task at a past time;
program instructions to extract into a set of encapsulated experience reports, an experience report associated with an asset in the collection, wherein the experience report was generated from the similar task at the past time;
program instructions to compute, using a processor and a memory, a degree of usability corresponding to the collection in the category based upon the set of encapsulated experience reports, the collection being usable in the category of the task up to the degree of usability;
program instructions to position, according to the degree of usability of the collection, the collection in a sorted list of reusable assets;
program instructions to select a reusable asset from the sorted list for use in the task;
program instructions to receive, from the task, an update to an experience report associated with the selected reusable asset, the update forming an updated experience report;
program instructions to reanalyze a set of experience reports associated with the selected reusable asset to determine a category modification associated with the selected reusable asset, the category of the selected reusable asset being dynamic and changeable with respect to a reuse in which the selected reusable asset participates, the set of experience reports including the updated experience report; and
program instructions to recompute a second degree of usability corresponding to the reusable asset, the reusable asset being usable in the category of the task up to the second degree of usability.

11. The computer usable program product of claim 10, further comprising:
program instructions to identify a second reusable asset located in a workflow management system, wherein the second reusable asset is situated under a control of an owner of the second reusable asset, and wherein the second reusable asset is categorized in the category;
program instructions to analyze a set of experience reports associated with the second reusable asset, wherein an experience report in the set of experience reports of the second reusable asset was generated from a different previous task, wherein the different previous task also belonged to the category;
program instructions to compute a second degree of usability corresponding to the second reusable asset, the second reusable asset being usable in the category of the task up to the second degree of usability;
program instructions to position, according to the second degree of usability of the second reusable asset, the second reusable asset in a sorted list of reusable assets.

12. The computer usable program product of claim 11, wherein the selected reusable asset is the second reusable asset.

13. The computer usable program product of claim 10, wherein the selected reusable asset is the collection.

14. The computer usable program product of claim 10, further comprising:
program instructions to analyze a task information associated with the task to identify a function performed by the task in a workflow management system; and
program instructions to select the category wherein the category corresponds to the function performed by the task.

15. The computer usable program product of claim 10, further comprising:
program instructions to enable the task to update an experience report associated with the selected reusable asset.

16. A computer system comprising one or more processors, one or more computer-readable memories, and one or more computer-readable storage devices, wherein the one or more computer-readable storage devices are not transitory signals per se, and program instructions stored on at least one of the one or more storage devices for execution by at least one of the one or more processors via at least one of the one or more memories, the stored program instructions comprising:
program instructions to determine, by a server, a category of a task being planned at a given time;
program instructions to identify a collection of assets stored in at least one data processing system in communication with the server, wherein the collection has been used in a similar task at a past time;
program instructions to extract into a set of encapsulated experience reports, an experience report associated with an asset in the collection, wherein the experience report was generated from the similar task at the past time;
program instructions to compute, using a processor and a memory, a degree of usability corresponding to the collection in the category based upon the set of encapsulated experience reports, the collection being usable in the category of the task up to the degree of usability;
program instructions to position, according to the degree of usability of the collection, the collection in a sorted list of reusable assets;
program instructions to select a reusable asset from the sorted list for use in the task;
program instructions to receive, from the task, an update to an experience report associated with the selected reusable asset, the update forming an updated experience report;
program instructions to reanalyze a set of experience reports associated with the selected reusable asset to determine a category modification associated with the selected reusable asset, the category of the selected reusable asset being dynamic and changeable with respect to a reuse in which the selected reusable asset participates, the set of experience reports including the updated experience report; and
program instructions to recompute a second degree of usability corresponding to the reusable asset, the reusable asset being usable in the category of the task up to the second degree of usability.

17. The computer system of claim 16, further comprising:
program instructions to identify a second reusable asset located in a workflow management system, wherein the second reusable asset is situated under a control of an owner of the second reusable asset, and wherein the second reusable asset is categorized in the category;
program instructions to analyze a set of experience reports associated with the second reusable asset, wherein an experience report in the set of experience reports of the second reusable asset was generated from a different previous task, wherein the different previous task also belonged to the category;
program instructions to compute a second degree of usability corresponding to the second reusable asset, the second reusable asset being usable in the category of the task up to the second degree of usability;
program instructions to position, according to the second degree of usability of the second reusable asset, the second reusable asset in a sorted list of reusable assets.

18. The computer system of claim 17, wherein the selected reusable asset is the second reusable asset.

19. The computer system of claim 16, wherein the selected reusable asset is the collection.

* * * * *